United States Patent [19]

Tongu

[11] Patent Number: 5,027,616
[45] Date of Patent: Jul. 2, 1991

[54] AIR-COOLED ABSORPTION TYPE COOLING AND HEATING APPARATUS

[75] Inventor: Shinji Tongu, Hamamatsu, Japan

[73] Assignee: Yazaki Corporation, Tokyo, Japan

[21] Appl. No.: 389,404

[22] Filed: Aug. 4, 1989

[30] Foreign Application Priority Data

Aug. 9, 1988 [JP] Japan ................................ 63-198181

[51] Int. Cl.⁵ ............................................ F25B 15/00
[52] U.S. Cl. ........................................ 62/476; 62/495
[58] Field of Search .................... 62/476, 238.3, 324.2, 62/495

[56] References Cited

U.S. PATENT DOCUMENTS 3,527,060  9/1970  Kruggel ............................ 62/476 X
4,691,528  9/1987  Tongu ............................... 62/476 X
4,791,790  12/1988  Tongu ................................. 62/476

FOREIGN PATENT DOCUMENTS 62-66068  3/1987  Japan .

Primary Examiner—Lloyd L. King
Attorney, Agent, or Firm—Venable, Baetjer, Howard & Civiletti

[57] ABSTRACT

An air-cooled absorption air-conditioner comprising a high-temperature regenerator for heating diluted solution which has absorbed refrigerant, a separator for separating refrigerant vapor obtained by the high-temperature regenerator from the diluted solution, a condenser for condensing the refrigerant vapor into liquid refrigerant, an evaporator for vaporizing liquid refrigerant, cooling circulation heat medium by the effecting heat exchange between it and the above-mentioned liquid refrigerant vaporized and supplying the circulation heat medium thus cooled to a space to be cooled, an absorber for allowing the refrigerant vapor generated in the evaporator to be absorbed by the solution separated in the separator and removing the heat thereby generated by air-cooling, and a heat-medium-circulation pump for circulating the circulation heat medium, the circulation heat medium being heated using the refrigerant vapor generated in the evaporator and supplied to a space to be heated. The evaporator includes a circulation-heat-medium passage which is in contact with a liquid-refrigerant-evaporation surface of the evaporator, and refrigerant-vapor flow passage connected to the separator and in contact with the circulation-heat-medium flow passage through a heat-transfer surface. A valve is provided at least in that portion of said refrigerant-vapor flow passage where refrigerant flows from this passage to the separator.

10 Claims, 3 Drawing Sheets

AIR-COOLED ABSORPTION TYPE COOLING AND HEATING APPARATUS

BACKGROUND OF THE INVENTION

1. Field of the Invention

This invention relates to an air-cooled absorption air-conditioner, and in particular to an air-cooled absorption air-conditioner equipped with simplified heat-exchanger elements.

2. Description of the Prior Art

Japanese Patent Application No. 60-179954 (Japanese Patent Laid-Open No. 62-66068) discloses a relevant prior art device. The device consists of an air-cooled absorption hot/cold-water air-conditioner, which includes a circulation-water pump and a three-way valve provided on the outlet side of the circulation-water pump. One outlet of the three-way valve is connected to an evaporator, the other outlet thereof being connected to a water heater provided in a separator. Circulation-water pipes respectively connected to the outlets of the evaporator and the water heater join together and are connected to the place where hot/cold water is required.

During cooling operation, opening/closing valves provided in ducts are opened, and the three-way valve is operated in such a manner as to allow the circulation-water pump to communicate with the evaporator. The circulation water delivered by the circulation-water pump flows through the three-way valve and the evaporator, and flows to the place where cold water is required after being cooled by refrigerant vaporizing on the outer surface of the evaporator.

During heating operation, the opening/closing valves are closed, the three-way valve being operated in such a manner as to allow the circulation-water pump to communicate with the water heater. The circulation water delivered by the circulation-water pump is heated by the water heater before it flows to the place where hot water is required.

Thus, the above-described prior art device requires a water heater which constitutes the heat exchanger for generating hot water by affecting heat exchange between hot refrigerant vapor and circulation water, as well as an evaporator which constitutes the heat exchanger for generating cold water by taking the condensation heat of refrigerant vapor from circulation water. Besides, with this air-conditioner, it is necessary to switch the circulation routes between the cold-water generation and hot-water generation modes, so that a three-way valve having a large aperture has to be provided on the outlet side of the circulation-water pump.

It is an object of this invention to provide an air-cooled absorption air-conditioner whose structure is simplified by reducing the number of heat exchangers and in which the switching between the cooling and heating modes is simplified.

SUMMARY OF THE INVENTION

In order to achieve the above object, the present invention provides an air-cooled absorption air-conditioner comprising a high-temperature regenerator for heating diluted solution which has absorbed refrigerant, a separator for separating refrigerant vapor obtained by means of the above-mentioned high-temperature regenerator from the above-mentioned diluted solution, a condenser for condensing the above-mentioned refrigerant vapor into liquid refrigerant, an evaporator for vaporizing the above-mentioned liquid refrigerant, cooling circulation heat medium by affecting heat exchange between it and the above-mentioned liquid refrigerant vaporized and supplying the circulation heat medium thus cooled to a space to be cooled, an absorber for allowing the refrigerant vapor generated in the above-mentioned evaporator to be absorbed by the solution separated in the above-mentioned separator and removing the heat thereby generated by air-cooling, and a heat-medium-circulation pump for circulating the above-mentioned circulation heat medium, the above-mentioned circulation heat medium being heated utilizing the refrigerant vapor obtained in the above-mentioned separator and supplied to a space to be heated, the above-mentioned evaporator including a circulation-heat-medium passage which is in contact with a liquid-refrigerant-evaporation surface of the above-mentioned evaporator, and refrigerant-vapor flow passage connected to the above-mentioned separator and in contact with the above-mentioned circulation-heat-medium flow passage through a heat-transfer surface, a valve being provided at least in that portion of the refrigerant-vapor flow passage where refrigerant flows from the above-mentioned refrigerant-vapor flow passage to the above-mentioned separator.

The circulation heat medium may be water. Alternatively, it may be freon or ammonia, using a compressor as the circulation-heat-medium pump.

In the above-described construction, refrigerant liquid vaporizes, during cooling operation, on the evaporation surface of the evaporator, thereby cooling the circulation flow medium in the circulation-heat-medium flow passage. During heating operation, refrigerant vapor is condensed in the refrigerant-vapor flow passage which is in contact with the circulation-heat-medium flow passage of the evaporator, thereby heating the circulation heat medium in the circulation-heat-medium flow passage.

Part of the refrigerant vapor generated in the separator enters the refrigerant-vapor flow passages of the evaporator also during cooling operation. However, since a valve is provided in one of the refrigerant-vapor passages (the passage through which refrigerant flows from the above-mentioned refrigerant-vapor flow passages to the evaporator) and this valve is closed during cooling operation, the refrigerant liquid generated through condensation in the refrigerant-vapor flow passages is reserved therein. When the refrigerant-vapor flow passages have become full of refrigerant liquid, no further refrigerant vapor enters the refrigerant-vapor flow passages, nor is the circulation heat medium in the circulation-heat-medium passage which is in contact with the refrigerant-vapor flow passages through the heat-transfer surface heated by the refrigerant vapor any further.

Using water as the circulation heat medium is advantageous from the economical point of view. Besides, water is safe since it does no harm to humans or animals if it leaks.

When freon or ammonia is used as the circulation heat medium and a compressor is provided as the circulation-heat-medium pump, the refrigerant gas, consisting of freon or ammonia, heated to high temperature through compression by the compressor, enters, during cooling operation, the circulation-heat-medium flow passage of the evaporator. This refrigerant gas is liquefied through cooling and condensation by liquid refrigerant vaporizing on the evaporation surface. Then, it absorbs heat in a load radiator and vaporizes, thereby affecting cooling. Afterwards, it is returned to the compressor. During heating operation, the refrigerant gas, heated to high temperature through compression by the compressor, radiates heat and condenses in the load radiator, thereby affecting heating. Afterwards, it is conveyed to the circulation-heat-medium flow passage of the evaporator. The refrigerant in the circulation-heat-medium flow passage is heated by the refrigerant vapor flowing through the refrigerant-vapor flow passages of the evaporator and vaporizes. Afterwards, it is compressed again by the compressor and repeats the above-described circulation.

DESCRIPTION OF THE PREFERRED EMBODIMENTS

Figure 1:
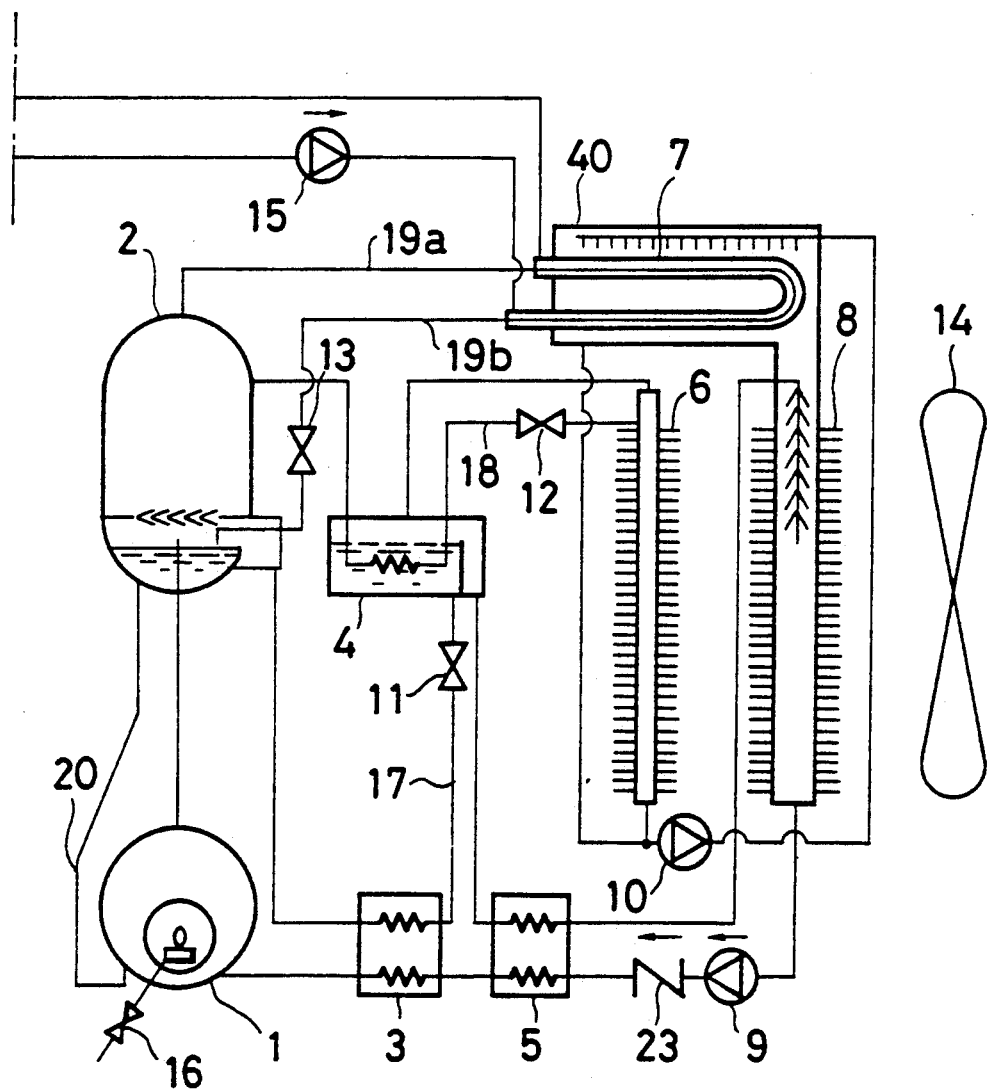
FIG. 1 is a system diagram of an air-cooled absorption air-conditioner constituting a first embodiment of this invention.

An embodiment of this invention will now be described with reference to FIG. 1, which shows a double-effect air-cooled absorption air-conditioner constituting a first embodiment of this invention. The double-effect air-cooled absorption air-conditioner shown comprises a high-temperature regenerator 1 for heating diluted solution, a separator 2 for separating refrigerant vapor and medium-concentration solution from the diluted solution heated by the high-temperature regenerator 1, a high-temperature heat exchanger 3 for affecting heat exchange between the medium-concentration solution and the diluted solution before entering the high-temperature regenerator 1, a low-temperature regenerator 4 which is connected to the medium-concentration-solution outlet of the high-temperature regenerator 3 through a medium-concentration-solution circuit 17 and which is adapted to generate new refrigerant vapor and to generate concentrated solution by affecting heat exchange between the refrigerant vapor separated from diluted solution in the separator 2 and the medium-concentration solution that has passed through the high-temperature heat exchanger 3, a valve 11 provided in the medium-concentration-solution circuit 17, a low-temperature heat exchanger 5 for affecting heat exchange between the concentrated solution generated in the low-temperature regenerator 4 and the diluted solution before entering the high-temperature heat exchanger 3, a condenser 6 connected through a refrigerant circuit 18 to the outlet for the refrigerant vapor which constitutes the heating medium of the low-temperature regenerator 4 and adapted to condense the entering refrigerant vapor into liquid refrigerant, a valve 12 provided in the refrigerant circuit 18, an evaporation chamber 40 connected to the condenser 6 through a liquid-refrigerant passage including a liquid-refrigerant pump 10, an evaporator 7 consisting of a double-pipe-type heat exchanger arranged in the evaporating chamber 40 and including an inner pipe which constitutes a refrigerant-vapor passage into which refrigerant vapor flows and an outer pipe which constitutes a circulating-heat-medium passage for vaporizing refrigerant on its outer peripheral surface by receiving circulation heat medium (This evaporator will be hereinafter referred to as a double-pipe-type heat exchanger), an absorber 8 communicating with the evaporating chamber 40 and adapted to generate diluted solution by allowing the refrigerant vapor generated by the evaporator to be absorbed by the concentrated solution which has passed through the low-temperature heat exchanger 5, an air-cooling fan 14 for removing the condensation heat of the condenser 6 and the absorption heat of the absorber 8 through air-cooling, a solution pump 9 for transmitting the diluted solution generated in the absorber 8 through a check valve 23, the low-temperature heat exchanger 5 and the high-temperature heat exchanger 3 to the high-temperature regenerator 1, a heater 16 for the high-temperature regenerator 1, a solution by-pass pipe 20 communicating that portion of the separator 2 which is below the liquid surface with the lower portion of the high-temperature regenerator 1, refrigerant ducts 19a, 19b connecting the separator 2 to the inner pipe of the double-pipe-type heat exchanger 7, a valve 13 provided in the refrigerant path 19b through which refrigerant flows toward the separator, and a heat-medium-circulation pump 15 connected to the outer pipe of the double-pipe-type heat exchanger 7 and adapted to circulate heat medium for circulation. The outer surface of the above-mentioned outer pipe constitutes an evaporation surface. The bottom section of the evaporation chamber 40 and the inlet side of the liquid-refrigerant pump 10 are connected to each other through piping. Water is used as the circulation heat medium.

During heating operation, the valves 11, 12 are closed, and the valve 13 is open, the diluted solution in the high-temperature regenerator 1 being heated by the heater 16. The refrigerant in the heated solution is vaporized in the separator 2. The refrigerant vapor thus generated flows through the refrigerant duct 19a into the refrigerant-vapor passage constituting the inner pipe of the double-pipe-type heat exchanger 7. Then, the vapor heats, by heat exchange, the circulation heat medium in the outer pipe of the double-pipe-type heat exchanger 7. Afterwards, it returns to the separator 2 through the refrigerant duct 19b and the valve 13. The refrigerant which has thus returned to the separator 2 is mixed with the solution in the bottom section of the separator 2 and becomes diluted solution. The diluted solution then flows through the solution by-pass pipe 20 and returns to the high-temperature regenerator 1, repeating the above-described cycle thereafter. The circulation heat medium is propelled by the heat-medium-circulation pump 15 and flows into the circulation-heat-medium passage which constitutes the outer pipe of the double-pipe-type heat exchanger 7, where it is heated, by heat exchange, by the refrigerant vapor flowing through the inner pipe, and then flows to a place where the heat is required (e.g., a heating unit). Since the valves 11, 12 are closed, liquid refrigerant does not enter the evaporation chamber 40, and no liquid refrigerant vaporizes on the evaporation surface. Accordingly, no heat exchange is affected between the circulation heat medium flowing through the outer pipe of the evaporator and the liquid refrigerant outside the outer pipe. Since the pressure in the evaporation chamber 40 is retained at a low level, the quantity of heat lost through the outer surface of the evaporator due to convection can be negligible.

During cooling operation, the valve 13 is closed and the valves 11, 12 are open. The diluted solution in the high-temperature regenerator 1 is heated by the heater 16, refrigerant vapor and medium-concentration solution being separated from the diluted solution in the separator 2. The refrigerant vapor heats the medium-concentration solution in the low-temperature regenerator 4, thereby newly generating refrigerant vapor. Afterwards, the refrigerant vapor flows through the refrigerant circuit 18 and the valve 12 into the condenser 6, where it is condensed into liquid refrigerant. The refrigerant vapor generated in the low-temperature regenerator 4 also flows into the condenser 6, and is condensed into liquid refrigerant. The liquid refrigerant generated in the condenser 6 is supplied to the evaporation chamber 40 by the liquid refrigerant pump 10. Then, it is sprayed over the evaporation surface and vaporizes while taking heat from the circulation heat medium flowing through the outer pipe of the evaporator. The medium-concentration solution undergoes heat exchange with the diluted solution in the high-temperature heat exchanger 3, and then flows through the valve 11 into the low-temperature regenerator 4, where it is heated by the refrigerant vapor and allows the refrigerant in it to vaporize, thus becoming concentrated solution. This concentrated solution undergoes heat exchange with the diluted solution in the low-temperature heat exchanger 5, and is then sprayed over the absorber 8, absorbing the refrigerant vapor generated in the evaporation chamber 40 so as to retain the evaporation chamber 40 at a predetermined pressure level. The condensation heat generated in the condenser 6 and the absorption heat generated in the absorber 8 are removed by the air-cooling fan 14. The concentrated solution which has absorbed refrigerant vapor in the absorber 8 becomes diluted solution, and is then transmitted to the high-temperature regenerator 1 by the solution pump 1 through the check valve 23, the low-temperature heat exchanger 5 and the high-temperature heat exchanger 3. The circulation heat medium delivered by the heat-medium-circulation pump 15 is, as stated above, cooled in the outer pipe of the evaporator, and then flows to the place where cold heat is required. Since, during cooling operation, the valve 13 provided in the refrigerant duct 19b connecting the refrigerant vapor passage constituting the inner pipe of the double-pipe-type heat exchanger to the separator 2 is closed, the refrigerant which is condensed as a result of heat exchange with the circulation heat medium flowing through the outer pipe of the double-pipe-type heat exchanger gathers in the inner pipe, and, since the no refrigerant vapor enters the inner pipe after it is filled with refrigerant, the circulation heat medium is not heated by the refrigerant vapor, so that no heat loss results.

Thus, in accordance with this embodiment, the double-pipe-type heat exchanger provided in the evaporation chamber functions as a heat-medium heater during heating operation, and as an evaporator during cooling operation, so that the number of heat exchangers can be less than that of the prior art. Furthermore, the separator includes no piping for containing heat medium, there is no danger of the heat medium boiling during cooling operation, as a result of being exposed to high temperature, so that it is not necessary to retain the pressure in the pipe at a high level so as to avoid such boiling. Moreover, since the double-pipe-type heat exchanger is provided in the evaporation chamber which is under low pressure, heat diffusion due to the convection around the outer surface of the outer pipe is negligible even when circulation heat medium at high temperature is flowing, as in heating operation, through the outer pipe which is in contact with the evaporation surface. In addition, since the passage for the circulation heat medium is the same for both cooling and heating operations, it is not necessary to affect passage switching between the two operations. Accordingly, a three-way valve having a large aperture is not needed.

The adoption of water as the circulation heat medium is advantageous in the following points: first, water is inexpensive. Second, it does no harm to humans or animals if it should leak.

Figure 2:
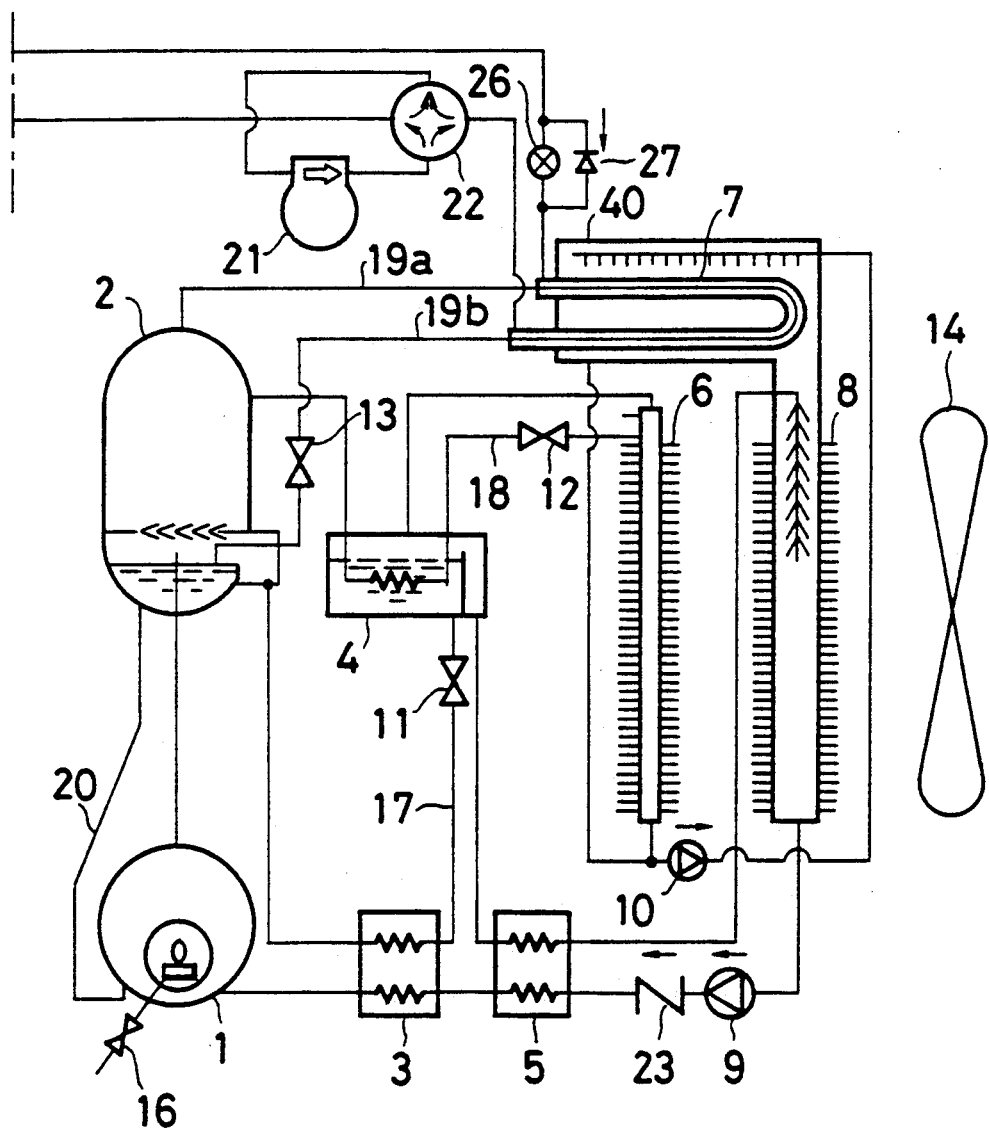
FIG. 2 is a system diagram of an air-cooled absorption air-conditioner constituting a second embodiment of this invention.

Next, a second embodiment of this invention will be described with reference to FIG. 2. Instead of employing water as the circulation heat medium and using a heat-medium-circulation pump, this embodiment employs freon and a compressor. It is also possible to employ ammonia instead of freon. The second embodiment differs from the first in that a compressor 21 is provided instead of the heat-medium-circulation pump 15, the outlet of the compressor 21 being connected to a four-way valve 22, one outlet of the four-way valve 22 being connected to one end of the outer pipe of the double-pipe-type heat exchanger 7, another outlet of the four-way valve 22 being connected to one end of the load using heat/cold-heat, still another outlet of the four-way valve 22 being connected to the inlet of the compressor, the other end of the load using heat and cold heat being connected to the other end of the outer pipe of the double-pipe-type heat exchanger 7 through an expansion valve 26 and a check valve 27. The four-way valve 22 can be set in a cooling state (indicated by the solid arrows in the drawing) in which the circulation heat medium delivered by the compressor 21 is allowed to enter the circulation-heat-medium passage constituting the outer pipe of the double-pipe-type heat exchanger 7 at one end thereof and in which the circulation heat medium leaving the cold-heat load is absorbed by the compressor, as well as in a heating state (indicated by the broken arrows in the drawing) in which the circulation heat medium delivered from the compressor is allowed to enter the heat load and in which the circulation heat medium leaving the circulation-heat-medium passage is absorbed by the compressor.

During cooling operation, the four-way valve 22 is retained in the cooling state described above. The circulation heat medium (freon) compressed by the compressor 21 is condensed into liquid as a result of the evaporation of the refrigerant sprayed over the outer surface of the evaporator. Afterwards, it vaporizes while affecting cooling by taking heat from the cold-heat load, and becomes circulation-heat-medium gas (freon gas) to be absorbed by the compressor. During this process, the valves 11, 12 are kept open, and the valve 13 is kept closed.

During heating operation, the four-way valve 22 is retained in the above-described heating state. The circulation-heat-medium (freon) gas enters the heat load, where it radiates heat, thus affecting heating. The gas is then condensed into liquid and enters the evaporator (outer pipe) through the expansion valve 26. Then, it is heated by the high-temperature refrigerant vapor coming from the separator 2 and entering the inner pipe constituting the refrigerant-vapor passage, and vaporizes to become freon gas, which is absorbed by the compressor 21. During this process, the valves 11, 12 are kept closed and the valve 13 is kept open.

In accordance with this invention, a refrigerant vapor passage and a circulation-heat-medium passage are combined to form an evaporator, which is arranged in an evaporation chamber. The CirCulation-heat-medium passage is arranged adjacent to an evaporation surface, and the circulation-heat-medium passage and the refrigerant-vapor passage are arranged adjacent to each other with a heat-transfer surface therebetween, so that the number of heat exchangers can be reduced, resulting in a simplified structure. At the same time, the switching between the cooling and heating modes is simplified. Furthermore, since a valve is provided in the pipe connecting the refrigerant-vapor passage to the separator, unnecessary heating of the circulation heat medium during cooling operation can be avoided, so that no heat loss is involved. In addition, it is no longer necessary to retain the circulation heat medium at a high pressure level in order to avoid its boiling.

The adoption of water as the circulation heat medium is advantageous in that it is inexpensive and that it is quite unlikely to do harm to humans or animals if it should leak.

When freon or ammonia is used as the circulation heat medium, heat transport is effected utilizing the phase changes of the circulation heat medium, so that a highly concentrated heat transport can be realized. Further, since it allows the diameter of the circulation-heat-medium piping to be made smaller, the equipment cost can be reduced.

Figure 3:
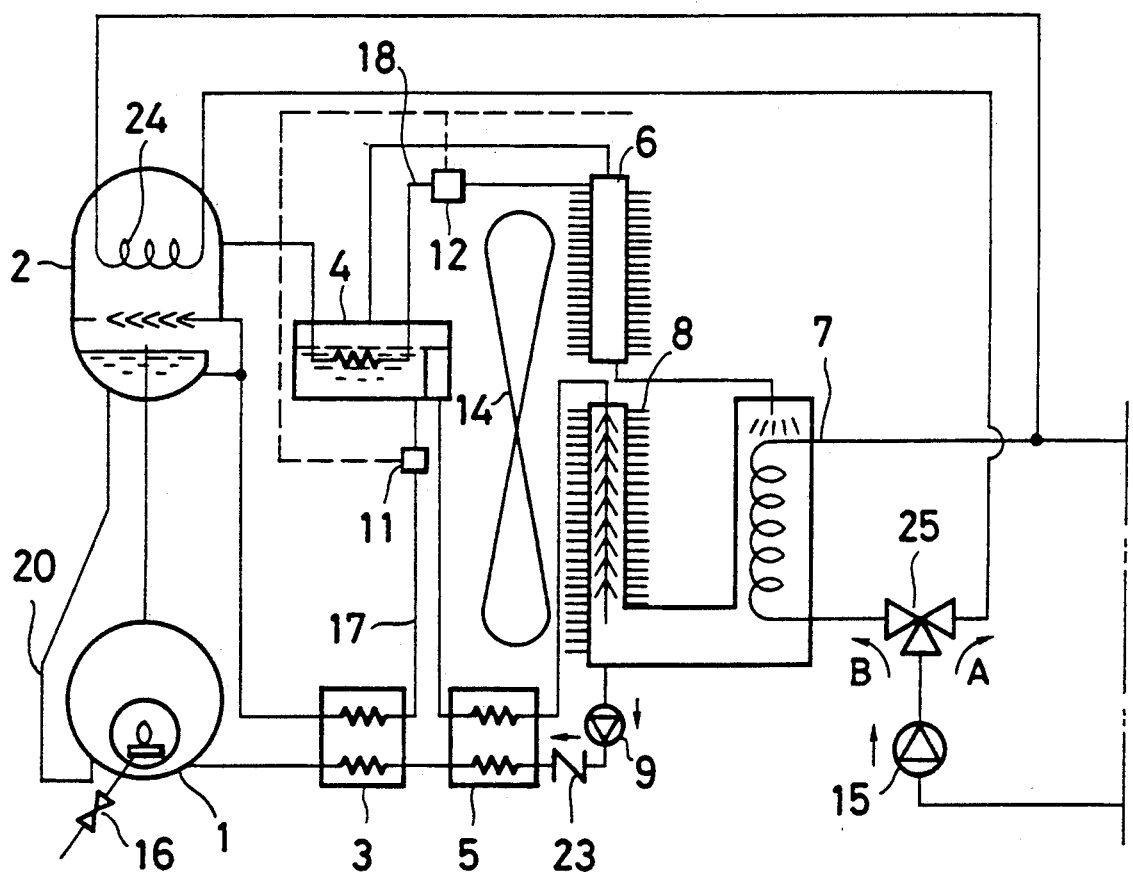
FIG. 3 is a system diagram of a conventional air-cooled absorption air-conditioner.

FIG. 3 shows a conventional air-cooled absorption hot/cold-water air-conditioner disclosed in Japanese Patent Application No. 60-179954 (Japanese Patent Laid-Open No. 62-66068). This air-cooled absorption hot/cold-water air-conditioner includes a circulation-water pump 15 and a three-way valve 25 provided on the outlet side of the circulation-water pump 15. One outlet of the three-way valve 25 is connected to an evaporator 7, the other outlet thereof being connected to a water heater 24 provided in a separator 2. Circulation-water pipes respectively connected to the outlets of the evaporator 7 and the water heater 24 join together and are connected to a place where hot/cold water is required. During cooling operation, opening/closing valves 11, 12 provided in ducts 17, 18 are opened, and the three-way valve 25 is operated in such a manner as to allow the circulation-water pump 15 to communicate with the evaporator 7. The circulation water delivered by the circulation-water pump 15 flows through the three-way valve 25 and the evaporator 7, and flows to the place where cold water is required after being cooled by refrigerant vaporizing on the outer surface of the evaporator.

During heating operation, the opening/closing valves 11, 12 are closed, the three-way valve 25 being operated in such a manner as to allow the circulation-water pump 15 to communicate with the water heater 24. The circulation water delivered by the circulation-water pump 15 is heated by the water heater 24 before it flows to the place where hot water is required.

Thus, the above-described conventional air-cooled absorption hot/cold-water air-conditioner requires a water heater which constitutes the heat exchanger for generating hot water by affecting heat exchange between hot refrigerant vapor and circulation water, as well as an evaporator which constitutes the heat exchanger for generating cold water by taking the condensation heat of the refrigerant vapor from the circulation water. Besides, with this air-conditioner, it is necessary to switch the circulation routes for the circulation water between the cold-water generation and hot-water generation operations, so that a three-way valve having a large aperture has to be provided on the outlet side of the circulation-water pump.

What is claimed is:

1. An air-cooled, absorption-type cooling and heating apparatus, comprising:
    a high-temperature regenerator for heating a diluted solution which has absorbed refrigerant;
    a separator for receiving said heated, diluted solution and separating said diluted solution into refrigerant vapor and a concentration solution;
    a condenser for condensing refrigerant vapor into liquid refrigerant;
    an evaporator, coupled to said separator and said condenser, which includes a double-pipe-type heat exchanger having an inner and outer pipe, wherein said inner pipe provided a passage for refrigerant vapor received from said separator via a first duct, and said outer pipe provides passage for a circulating heat medium, said outerpipe having an outer surface that provides an evaporation surface for vaporizing liquid refrigerant; and
    an absorber, coupled to said evaporator, in which refrigerant vapor generated by said evaporation surface is absorbed by said concentration solution received from said separator.

2. The air-cooled, absorption-type cooling and heating apparatus of claim 1 further comprising:
    a second duct coupled to said inner pipe for providing passage of refrigerant from said inner pipe to said separator; and
    a stop valve provided in said second duct for controlling the flow of refrigerant vapor through said inner pipe.

3. The air-cooled, absorption-type cooling and heating apparatus of claim 1 further comprising
    a first conduit, coupled to said separator, for providing passage of refrigerant vapor from said separator to said condenser;
    a second conduit, coupled to said separator, for providing passage of concentration solution from said separator to said absorber;
    a first stop valve provided in said first conduit for controlling the flow of refrigerant vapor to said condenser; and
    a second stop valve provided in said second conduit for controlling the flow of concentration solution to said absorber.

4. The air-cooled, absorption-type cooling and heating apparatus of claim 2, wherein during cooling operation of the apparatus, said stop valve is in a closed position so that the refrigerant vapor from the separator is thereby fed to the condenser and the liquid refrigerant from the condenser is sprayed over the evaporation surface, and the heat medium is fed to said outer pip, such that heat from said heat medium is transferred to said evaporation surface to cause vaporization of said sprayed liquid refrigerant.

5. The air-cooled, absorption-type cooling and heating apparatus of claim 3, wherein during heating operation of the apparatus, said first and second stop valves are in closed positions so that the refrigerant vapor from said separator is thereby fed to said inner pipe and the heat medium is fed to said outer pip such that heat from said refrigerant vapor in the inner pipe is transferred to said heat medium in the outer pipe.

6. The air-cooled, absorption-type cooling and heating apparatus of claim 1 further comprising:
a heat-medium-circulation pump for circulating said heat medium through said outer pipe.

7. The air-cooled, absorption-type cooling and heating apparatus of claim 1, wherein said circulating heat medium comprises water.

8. The air-cooled, absorption-type cooling and heating apparatus of claim 1, wherein said circulating heat medium comprises freon or ammonia, and a compressor is provided for circulating said heat medium through said outer pipe.

9. The air-cooled, absorption-type cooling and heating apparatus of claim 1, further comprising:
a liquid refrigerant pump for delivering liquid refrigerant to said evaporation surface, said pump having suction inlets connected to the bottom of the evaporator and to the condenser and a delivery outlet adjacent said evaporator surface.

10. The air-cooled, absorption-type cooling and heating apparatus of claim 1, further comprising and air-cooling fan, said air-cooling fan being capable of removing heat generated in said absorber.

* * * * *